United States Patent [19]

Asakawa et al.

[11] 4,367,395
[45] Jan. 4, 1983

[54] THERMAL PEN TIP

[75] Inventors: Yukio Asakawa; Katsuto Nagano; Syozo Sasa, all of Tokyo, Japan

[73] Assignee: TDK Electronics Co., Ltd., Tokyo, Japan

[21] Appl. No.: 124,123

[22] Filed: Feb. 25, 1980

[30] Foreign Application Priority Data

Jun. 22, 1979 [JP] Japan ................................ 54-78147

[51] Int. Cl.³ .............................................. H05B 1/00
[52] U.S. Cl. .................................... 219/216; 219/543; 338/309; 346/76 PH
[58] Field of Search ............. 219/216, 543; 346/76 R, 346/76 PH; 401/1; 357/28, 56; 338/308, 309; 29/620, 611; 252/518; 427/96, 101, 102, 103

[56] References Cited

U.S. PATENT DOCUMENTS

| 3,939,325 | 2/1976 | Otani et al. | 219/216 |
| 3,973,106 | 8/1976 | Ura | 219/216 |
| 4,203,025 | 5/1980 | Nakatani | 219/216 |

Primary Examiner—Volodymyr Y. Mayewsky
Attorney, Agent, or Firm—Oblon, Fisher, Spivak, McClelland & Maier

[57] ABSTRACT

A thermal pen tip comprising a heat reserve layer formed on an insulating substrate; a resistance layer for heating formed on said heat reserve layer; and a protective layer formed on said resistance layer, wherein said heat reserve layer has a convex top having a curvature and a flat surface on said convex top, so as to have a size corresponding substantially to a width of a line and said resistance layer for heating is formed on said flat surface of said heat reserve layer.

3 Claims, 18 Drawing Figures

FIG. 4
FIG. 5 (a)
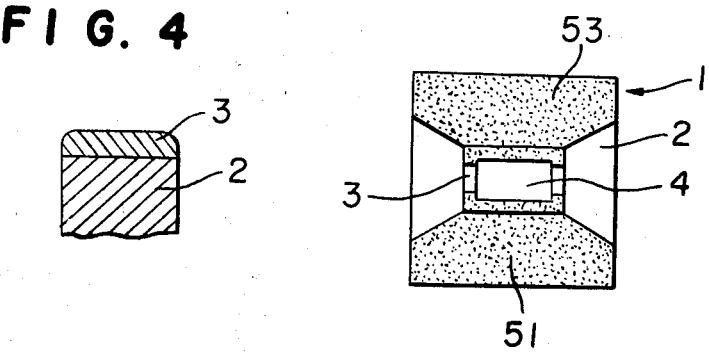
FIG. 5 b
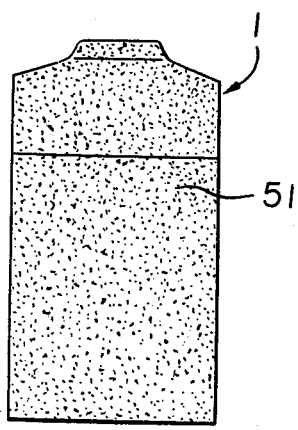
FIG. 6
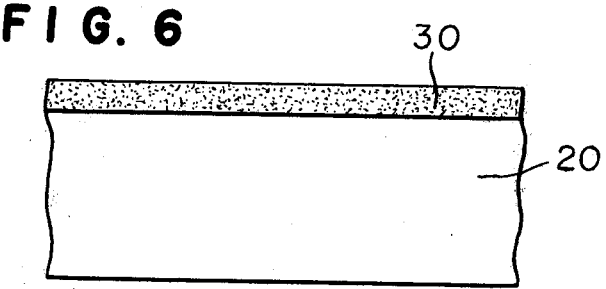

THERMAL PEN TIP

BACKGROUND OF THE INVENTION

1. Field of the Invention

The present invention relates to a thermal pen tip and the preparation thereof.

2. Description of the Prior Art

Recently, a thermal recording system using a thermal pen tip has been studied and practically used in various fields in view of high functional characteristics of the apparatus and low maintenance. The thermal pen tip comprises a resistant layer for heating and it is heated by feeding current to the resistant layer for heating. On the other hand, the heat is transferred to a thermal sensitive paper which is slidably brought into contact with the thermal pen tip. One of various coloring reactions such as a reduction is resulted on the thermal sensitive paper whereby a recording of figures and symbols is resulted by the coloring.

The conventional thermal pen tip usually has a structure shown in FIG. 1 wherein the thermal pen tip (1) comprises a prismatic tip shaped insulating ceramic as an insulating substrate (2) and a heat reserve layer (3) made of glaze glass in uniform thickness is formed on all of the main rectangular surfaces of the insulating substrate (2) so as to reserve a desired heat energy resulted by feeding the current through the resistance layer (4) for heating.

The resistance layer (4) is formed at the central part on the upper surface of the heat reserve layer (3) and a pair of a conductive layers (51), (53) are extended to the heat reserve layer (3) and the side surface of the substrate (2) at the end of the resistance layer (4). As the most upper layer, a protective layer (6) is formed to be substantially the same as the area of the main surface of the substrate (2) thereby preventing the wearing caused by abrasion of the thermal sensitive paper with which the upper surface is slidably brought into contact. Thus, a width of the colored line formed on the thermal sensitive paper by the thermal pen tip is depending upon an area for slidably contacting the thermal pen tip with the thermal sensitive paper.

The width of the coloring line is decided by the area of the main surface of the insulating substrate in the case of the abovementioned conventional thermal pen tip. In view of said fact and the technology for cutting the insulating ceramic for forming tips and the strength required for the tip, it is difficult to give a width and a length of the main surface of the insulating substrate less than 300 $\mu$m. Therefore, it is advantageously difficult to write lines having a width of less than 300 $\mu$m by the conventional thermal pen tip.

The inventors have proposed to use a thermal pen tip having the structure shown in FIG. 2 so as to overcome said problems.

In FIG. 2, the thermal pen tip (1) comprises a square prismatic tip type insulating ceramic substrate (2) and a heat reserve layer (3) formed on the main surface of the substrate (2). In said structure, the upper surface of the heat reserve layer (3) forms a convex surface having a desired curvature to at least one side of the main surface of the substrate (2) and the heat reserve layer (3) has a semispherical or semicylindrical curved configuration. The resistant layer for heating (4), a pair of the conductive layers (51), (53) and the protective layer (6) are formed on the heat reserve layer (3) are the same as those of the former embodiment.

The thermal pen tip which has been previously proposed, has a semispherical or semicylindrical curved convex configuration as the contact surface which slidably contacts the thermal sensitive paper with the thermal pen tip whereby the area for slidably contacting with the thermal sensitive paper can be remarkably smaller than that of the conventional thermal pen tip and the line recorded can be thinner with high contrast than that of the conventional thermal pen tip. However, the inventors have studied further and have found that such proposed thermal pen tip has the following disadvantages.

Firstly, the slidably contact surface of the thermal sensitive paper is curved, whereby the slidably contact area is varied depending upon fluctuation of the pen pressure or change of the curvature of the curved surface caused by fluctuation of the condition of the preparation for each product. Therefore, the accuracy and evenness of the width of the colored line are not satisfactory.

Secondly, it is difficult to decide the condition of the preparation for providing a desired curvature of the curved surface so as to give a desired width of the colored line because the slidably contact surface of the thermal sensitive paper is curved. Thus, it is difficult to prepare plural kinds of the thermal pen tips having different slidable contact surfaces by one machine.

Thirdly, although the slidable contact area can be minimized, the normal pushing pressure is too high whereby the wearing of the protective layer contacting with the slidable contact surface is too much and the width of the colored line is disadvantageously varied for a long operation.

SUMMARY OF THE INVENTION

It is an object of the present invention to overcome the disadvantages of the conventional thermal pen tip and to provide a thermal pen tip which can draw a fine line without any variation of each slidable contact surface for each preparation, and without any variation of each slidable contact area under fluctuation of a pen pressure so as to impart high accuracy and evenness of a width of a colored line formed by the tip.

It is another object of the present invention to provide various thermal pen tips which can be easily prepared in high accuracy so as to provide various precise and even widths of colored lines which can be thin to thick.

It is the other object of the present invention to provide a thermal pen tip which applies pen pressure suitable for preventing wearing of a protective layer even under the normal pushing pressure.

The foregoing and other objects of the present invention have been attained by providing a thermal pen tip which comprises a heat reserve layer on an insulating substrate; a resistance layer for heating formed on the heat reserve layer; and a protective layer formed on the resistance layer for heating wherein the upper part of the heat reserve layer has a convex configuration having a desired curvature and has a flat surface at the top of the convex configuration and a size of the flat surface substantially corresponds to a width of a coloring line and the resistance layer for heating is formed on the flat surface.

BRIEF DESCRIPTION OF THE DRAWINGS

FIG. 3 shows views of one embodiment of the thermal pen tip of the present invention wherein FIG. 3(a) is a plan view; FIG. 3(b) is a front view without the protective layer; FIG. 3(c) is a side view without the conductive or protective layer and FIG. 3(d) is a partial sectional view taken along the line III—III in FIG. 3(a);

FIG. 4 is a partial sectional view of the other embodiment of the thermal pen tip of the present invention;

FIG. 5 shows the other embodiment of the present invention wherein FIG. 5(a) is a plan view; FIG. 5(b) is a front view both without the protective layer;

FIGS. 6 to 12 show various views for illustrating the preparation of the present invention;

FIG. 6 is a front view showing the condition after a forming step of glaze glass;

FIGS. 7 to 9 respectively show the conditions after a grinding step wherein

FIGS. 8 and 9 are respectively plan views of the other embodiments;

FIG. 10 is a front view of one embodiment in the condition after a melting step;

FIGS. 11 and 12 are respectively show the condition after a second grinding step wherein FIG. 11(a) and FIG. 12 are respectively plan views of the other embodiments and FIG. 11(b) is a front view of the embodiment of FIG. 11(a).

DETAILED DESCRIPTION OF THE PREFERRED EMBODIMENTS

Figure 1:
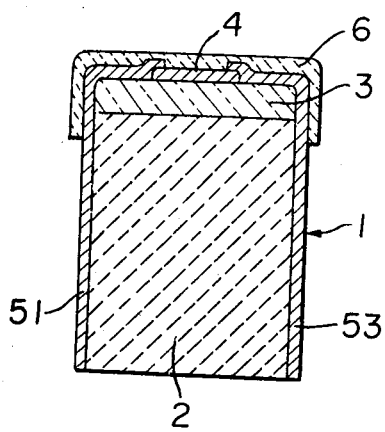
FIGS. 1 and 2 are respectively sectional views of the conventional thermal pen tips.
Figure 2:
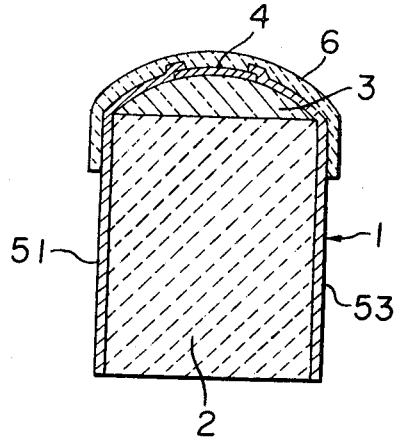
Figure 3:
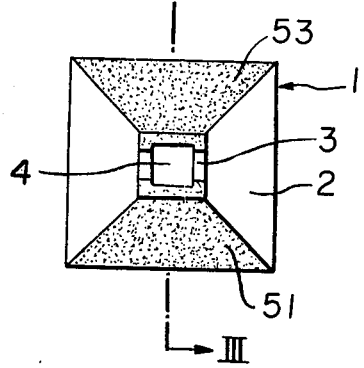
Figure 3:
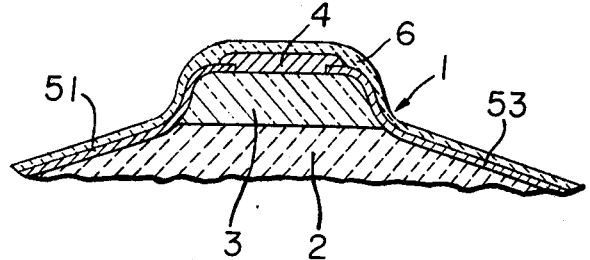
Figure 3:
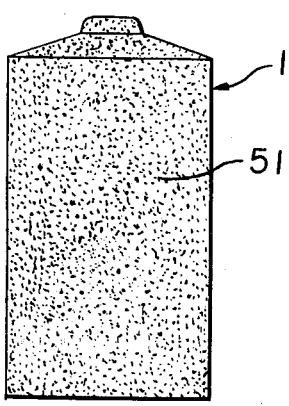
Figure 3:
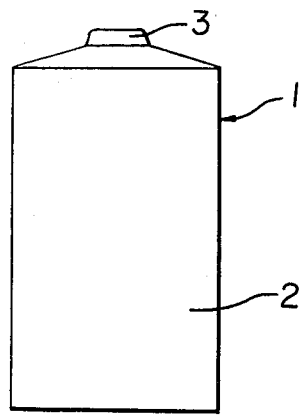

Referring to FIGS. 3 to 5, the thermal pen tip of the present invention will be illustrated.

In FIGS. 3 to 5, the thermal pen tip (1) is formed on the insulating substrate (2) which is made of an insulating ceramic in substantially square prismatic configuration. A heat reserve layer (3) made of glaze glass is formed on a desired part of all of the insulating substrate (2). The glaze glass can be a desired conventional composition. In this case, the insulating substrate (2) can be a square prismatic configuration having a rectangular flat surface at the top and the heat reserve layer (3) can be formed on a part or all of the rectangular flat surface. It is preferable to form the heat reserve layer on all of the top surface as shown in FIG. 4 in view of the improvement of the contact of the insulating substrate (2) with the thermal sensitive paper or the prevention of the adhesion of a dust on the substrate (2). When the heat reserve layer (3) is formed on all of the top surface of the insulating substrate (2) as shown in FIG. 4, the curvature of the upper convex part of the heat reserve layer (3) can be increased and the size of the flat part of the convex top part is minimized so as to give fine width of the colored line. Thus, there is the limitation for minimizing the length and the width of the top part of the insulating surface (2). Therefore, it is preferable to give the structure of the top part of the insulating substrate (2) as shown in FIG. 3 and 5.

In FIGS. 3(a) to (d), the top part of the insulating substrate (2) has the square flat surface at substantially the central part and the side surfaces slant downwardly from the flat surface to the sides of the insulating substrate (2) at a constant angle by cutting the sides of the top part of the insulating substrate (2). Thus, the heat reserve layer (3) is formed on the square flat surface. When the insulating substrate (2) is formed in such configuration, it is possible to eliminate the trouble of the contact between the substrate (2) and the thermal sensitive paper or the trouble of the adhesion of the dust on the top of the substrate (2). Even though the size of the insulating substrate (2) is relatively large, the size of the flat surface of the heat reserve layer (3) at the top which decides the width of the colored line can be selected as desired in the wide range. Therefore, the grinding of the ceramic for forming the insulating substrate can be easy and the strength of the insulating substrate (2) can be high enough. Moreover, the resistant layer 4 for heating and the conductive layers (51), (53) can be easily formed advantageously.

In said case, in FIG. 3, the flat surface at the top of the insulating substance (2) is formed in the square shape. This is preferable to give uniform width of the colored line regardless of the shifting direction of the pen on the heat sensitive paper. When colored lines having different widths depending upon the shifting direction of the pen on the thermal sensitive paper (such as X-direction and Y-direction) are desired, for example, in the heat sensitive recordings for medical purposes such as electrocardiograms, it is preferable to give rectangular shape (non-square) as the flat surface at the top of the insulating substrate (2) as shown in FIGS. 5(a), (b).

The shape of the flat surface can be varied as desired.

In FIG. 3, the slant surfaces having slant edges are formed at a constant angle from the flat surface at the top to the sides of the insulating substrate (2). The slant angle need not be always a constant slant angle and the slant angle in each side need not be always the same in all of the directions. The slant angle can be different as shown in FIG. 5. The size of the flat surface at the top of the insulating substrate (2) is preferably a length of about 100 to 500 $\mu$m. The slant angle is preferably about 20 to 45 degrees. The size of the insulating substrate (2) can be selected as desired from a wide range.

The heat reserve layer (3) formed on the insulating substrate (2) has a convex configuration having a desired curvature at the top, which means a configuration having substantially no edge. The curvature can be selected as desired from a wide range. It need not be a constant curvature. The flat surface is formed at the top of the convex part of the heat reserve layer (3) and the boundary of the flat surface has substantially no edge. That is, the configuration of the top of the heat reserve layer has a desired curvature without edges in various solid configurations formed by cutting a prismatic pyramid or spherical heat reserve layer at the top by a parallel plane. Thus, the area for slidable contact between the top protective layer (6) (not shown in FIG. 3a) and the thermal sensitive paper is varied depending upon the area of the flat surface at the top of the heat reserve layer (3). Therefore, the thermal pen tip having a desired width of the colored line can be easily obtained.

When the length of the flat surface at the top of the heat reserve layer (3) is different from the length in the cross direction as shown in FIG. 5, it is possible to obtain the thermal pen tip which can draw the colored line having different widths in X-direction and Y-direction on the thermal sensitive paper.

The size of the flat surface at the top of the heat reserve layer (3) is preferably to have a length of about 100 to 500 μm and the thickness of the heat reserve layer (3) is preferably about 60 to 200 μm.

The resistance layer for heating (4) is formed as a thin film having substantially uniform thickness, on a part or all of the flat surface or over the boundary of the flat surface at the top of the heat reserve layer (3) as shown in FIGS. 3(d) and 5(a). The resistance layer (4) is usually made of tantalum nitride formed by a spattering; nickrom formed by a metal vapor deposition, a polycrystalline silicon formed by epitaxial growth in a thin film structure. A pair of the conductive layers (51), (52) are placed for passing the current through the resistance layer for heating (4). The conductive layers (51), (52) can be placed on either the upper part or the lower part of the resistance layer for heating (4). It is preferable to form the conductive layers so as to superpose each of them on each end of the resistance layer for heating (4) and to extend from the heat reserve layer (3) to the side surface of the insulating substrate (2).

The conductive layers (51), (52) are preferably made of a high melting point metal which is durable to the heat caused by the resistance layer (4) and does not generate needless heat by the current and has high ohmic property to the resistance layer (4) such as tungsten, molybdenum, titanium and the other metals such as gold. The conductive layers are preferably formed as a thin film structure by a sputtering, a metal vapor deposition or an epitaxial growth etc.

The protective layer (6) formed as a top layer is made of a material which is durable to the heat caused by the resistance layer (4); and prevents variations of heat generation of the resistance layer (4) caused by an oxidation with air; and prevents wearing of the resistance layer caused by slidable contact with the thermal sensitive paper and has less wearing property. Therefore, the protective layer is preferably phosphorus boride, tantalum pentoxide, silicon carbide etc. in a thin film form.

The protective layer (6) can be placed at all of the slidable contact surface. In the structure shown in FIGS. 3(a) and 5(a), the protective layer (6) is formed on all of the top surface of the thermal pen tip (1).

In the thermal pen tip of the present invention having said structure, the area for the slidable contact between the top protective layer (6) and the thermal sensitive paper is varied depending upon the area of the flat surface at the top of the heat reserve layer (3) whereby various colored lines having different widths from thin to thick can be easily drawn. The area of the flat surface at the top of the heat reserve layer (3) can be easily and precisely controlled. Thus, the fluctuation of the widths of the colored lines drawn by different products is quite small. Moreover, the flat surface of the heat reserve layer (3) decides the area for slidable contact to the thermal sensitive paper. Therefore, the width of the colored line is uniform under the variation of the pen pressure. The slidable contact part of the top protective layer (6) is smooth and the drawability is excellent. There is substantially not any edge at the boundary of the flat surface at the top of the heat reserve layer (3) and accordingly, the slidable contact end of the top protective layer (6) has not any edge whereby the fluctuation of the width of the colored line caused by wearing can be minimized. Moreover, the thermal pen tip which can draw color lines having different widths in X-direction and Y-direction can be obtained by forming the flat surface at the top of the heat reserve layer (3) in X-direction and Y-direction as shown in FIG. 5.

The thermal pen tip of the present invention can be prepared by coating the glaze glass for the heat reserve layer on the insulating substrate; if necessary, grinding the glaze glass and the insulating substrate and if necessary, melting the glaze glass and grinding the top and then softening the glaze glass to form the heat reserve layer having the desired configuration and then, forming the resistance layer for heating, the conductive layer and the protective layer.

In said preparation, the insulating substrate (2) in a form of a tip having the configuration shown in FIGS. 3 to 5 or in a prismatic configuration can be used as the insulating substrate in the above-mentioned processing in series. Thus, in order to prepare the thermal pen tip in high efficiency, it is preferable to use a plate made of ceramic as the insulating substrate material and to obtain many thermal pen tips (1) from the ceramic plate (20) as the insulating substrate material by the steps shown in FIGS. 6 to 12.

In such optimum embodiment, firstly, the conventional glaze glass (30) is coated on the ceramic plate (20) having a thickness corresponding to the length of the insulating substrate (2) as shown in FIG. 6. In said step, the coating of the glaze glass (30) can be carried out by a conventional doctor blade method, a spinner method or a screen method and the thickness can be about 60 to 200 μm.

Figure 7A:
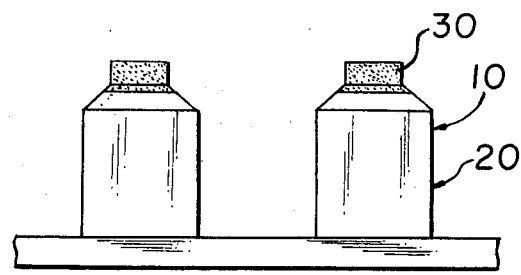
FIG. 7(a) is a front view of one embodiment.
Figure 7B:
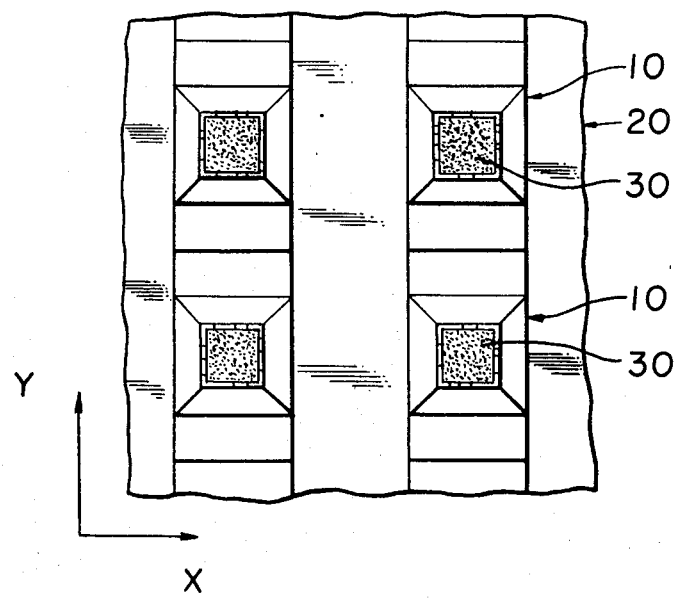
FIG. 7(b) is a plan view of the embodiment of FIG. 7(a)
Figure 8:
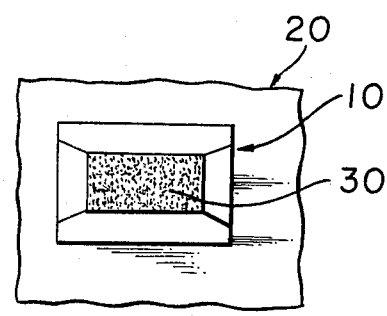
Figure 9:
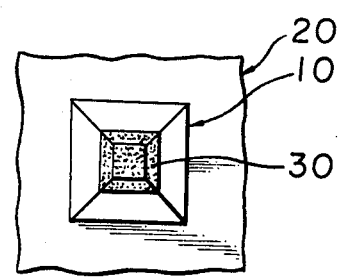

The glaze glass (30) and parts of the ceramic plate (20) are caved by a slicer etc. as shown in FIGS. 7 to 9. In the grinding of the glaze glass (30) and the ceramic plate (20), they are caved in the cross directions of X-direction and Y-direction on the ceramic plate (20) as shown in FIG. 7(b) so as to remain the thermal pen tip units (10) in a regular arrangement.

In the step shown in FIG. 7, the glaze glass (30) for the units (10) is caved so as to form a square prismatic configuration from the top to the bottom. On the other hand, the ceramic plate (20) for the units (10) is caved in X-direction so as to form the slant surfaces from the glaze glass (30) and the side surfaces connected to the slant surfaces respectively, as shown in FIG. 7(a). Thus, the coating of the conductive layer is made easy and the bottom of the ceramic plate (20) is slightly remained so as to maintain the arrangement of the units (10). The ceramic plate (20) for the units (10) is caved in Y-direction so as to form slant surfaces. The bottom of the glaze glass (30) is caved to form the slant surface. Thus, it is possible to cave the ceramic plate so as to form the prismatic units near the bottom as shown in FIG. 8. In view of the accuracy of the grinding, the feature shown in FIG. 7 is preferable.

In FIG. 8, the glaze glass (30) for the units (10) is caved so as to form the rectangular (non-square) prismatic configuration which is suitable for said special usages.

In FIG. 8, the ceramic plate is caved so as to form slant surfaces having different slant angles in X-direction and Y-direction at the upper part of the unit (10) and is caved near the bottom to form the side surfaces of the insulating substance in each unit (10) in X-direction and Y-direction.

In FIG. 9, the glaze glass (30) is caved so as to form a pyramide configuration of the glaze glass (30) in each unit (10). In this grinding step, the glaze glass (30) and the ceramic plate (20) can be caved to form various configurations as mentioned above, so as to correspond to the configurations of the insulating substrate (2) and the heat reserve layer (3) of the thermal pen tip.

In the next step, the caved glaze glass (30) is melted. The temperature and the time for the melting can be selected as desired. The edges formed on the caved glaze glass (30) are eliminated by the melting and the top of the glaze glass (30) has a curvature.

Figure 10:
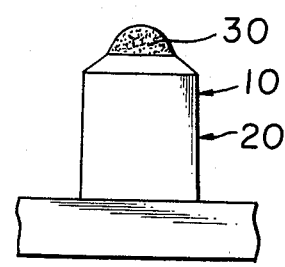

For example, when it is caved as shown in FIG. 7, the configuration shown in FIG. 10 is given.

The convex tops of the glaze glass (30) formed so as to have each curvature which are formed on the units (10), are ground to form each flat surface corresponding to the width of the colored line.

Figure 11A:
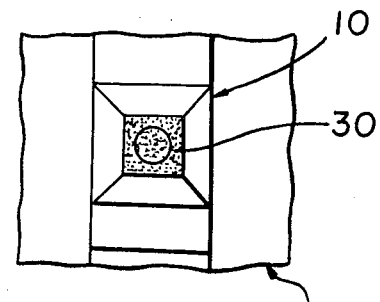
Figure 11B:
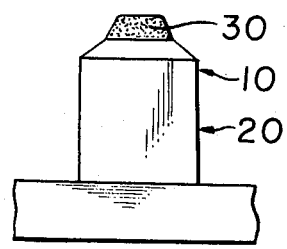
Figure 12:
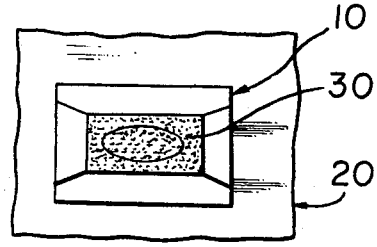

The shape of the flat surface at the top of the glaze glass (30) on the unit (10) can be varied as shown in FIGS. 11(a), (b) by caving as shown in FIG. 7; and as shown in FIG. 12 by caving as shown in FIG. 8.

In the next step, the glaze glass (30) is softened under the conventional condition whereby the edges at the boundary of the flat surface are eliminated so as to form the heat reserve layer (3) as shown in FIGS. 3 to 5.

The heat reserve layer having a desired configuration can be obtained by caving the glaze glass as shown in FIG. 7 to 9 in the grinding step and then is treated by the softening step. In such case, the melting step and the grinding step can be eliminated.

In accordance with the conventional steps, the resistance layer for heating (4); the conductive layers (51), (52) and the protective layer (6) are formed as the films and then, the coated units (10) are separated by further caving so as to form the thermal pen tips of the present invention.

We claim:

1. A thermal pen tip comprising:
   an insulating substrate having a flat surface and side surfaces slanting away from said flat surface;
   a heat reserve layer having one surface formed on said flat surface of said substrate, side surfaces and a second convex surface opposite said one surface, said second surface including a flat center portion having a predetermined width and end portions curving to merge with said side surfaces of said heat reserve layer, said side surfaces being slanted relative to said second surface whereby no sharp edge is formed therebetween;
   a resistance layer having a first thickness formed only on said flat portion of said second surface and including electrical terminal means; and
   a thermally conductive and electrically nonconductive layer having a second thickness formed on said resistance layer, said protective layer including a flat center portion having a predetermined width and end portions curving to conform to said heat reserve and resistance layers, the radius of curvature of said end portions of said protective layer being at least twice the sum of said first and second thickness,
   whereby a line drawn by said thermal pen tip will have a width corresponding to said predetermined width of said flat center portion of said protective layer.

2. A thermal pen tip according to claim 1 wherein said flat portion of said second surface has a square shape.

3. A thermal pen tip according to claim 1 wherein said flat portion of said second surface has a rectangular shape having a length different from said predetermined width.

* * * * *